(12) United States Patent
Robinson

(10) Patent No.: US 7,832,538 B2
(45) Date of Patent: Nov. 16, 2010

(54) COMPLETE POWER PTO DISCONNECT ASSEMBLY

(75) Inventor: Bryan Robinson, Rockton, IL (US)

(73) Assignee: Cotta Transmission Company, Beloit, WI (US)

(*) Notice: Subject to any disclaimer, the term of this patent is extended or adjusted under 35 U.S.C. 154(b) by 599 days.

(21) Appl. No.: 11/828,603

(22) Filed: Jul. 26, 2007

(65) Prior Publication Data
US 2008/0022792 A1    Jan. 31, 2008

Related U.S. Application Data

(60) Provisional application No. 60/834,057, filed on Jul. 27, 2006.

(51) Int. Cl.
*F16D 11/10* (2006.01)
*F16D 25/061* (2006.01)

(52) U.S. Cl. ................ 192/69.9; 192/83; 192/85.57; 192/114 T

(58) Field of Classification Search ............... 192/69.9, 192/85 V, 85.48, 85.56–85.59; 74/15.8, 15.82
See application file for complete search history.

(56) References Cited

U.S. PATENT DOCUMENTS

| | | | | | |
|---|---|---|---|---|---|
| 1,440,341 | A | * | 12/1922 | Crispen | 192/69.9 |
| 1,696,179 | A | * | 12/1928 | Ahlm | 192/69.9 |
| 2,535,388 | A | * | 12/1950 | Burks et al. | 192/69.9 |
| 3,348,645 | A | * | 10/1967 | Sigg | 192/69.9 |
| 3,481,437 | A | * | 12/1969 | Araikawa | 192/85 C |
| 6,766,707 | B2 | * | 7/2004 | Schupp | 192/114 T |

* cited by examiner

*Primary Examiner*—Rodney H Bonck
(74) *Attorney, Agent, or Firm*—Schiff Hardin LLP

(57) ABSTRACT

A modularly designed mechanical or pressure activated power coupling and complete disconnect assembly independently mounted or directly coupled to a bell housing mount on a drive engine or powered side equipment has provisions for coupling the driveline power via an integrated torsional coupling, drive plate or other mechanism to the rotating member, engine, and powered side equipment.

1 Claim, 2 Drawing Sheets

COMPLETE POWER PTO DISCONNECT ASSEMBLY

CROSS REFERENCE TO RELATED APPLICATIONS

The present application claims the benefit of U.S. Provisional Application No. 60/834,057, filed Jul. 27, 2006, herein incorporated by reference.

BACKGROUND

The invention relates to power transmission devices, and particularly to couplers between a power source and a power driven implement. Specifically, the invention relates to a complete disconnect of the powering device in line to the powered implement without having power transmission driven plates and their unnecessary wear.

The use of clutches in various types couple power from a power source such as an engine to auxiliary pieces of equipment in commonly known. Presently, over center mechanical engine clutches are often used to couple the flywheel of an engine to an auxiliary piece of equipment. Such clutches suffer from a number of problems, including pilot bearing failures, excessive wear, frequent adjustment and daily maintenance schedules. The heavy wear occurs in the clutch plates and by discs rubbing during long periods of disengagement causing heat generation and premature failure of these components.

SUMMARY

The following description relates to various embodiments envisioned for the present invention.

According to various embodiments of the invention, a first advantageous aspect is that the power can be completely disconnected from two rotating members which ensures that there is no unnecessary wear on the power disconnects assembly's internal components. This unnecessary component wear is extremely common in any disc style clutch mechanism design while the unit is in a disengaged operation for any length of time associated with a certain engagement time associated with many types of powered equipment.

A second advantageous aspect of the design is that it allows the disconnect assembly to be powered from either end of the unit such as powering in the flywheel end of a compressor via a rotating member. The unit can be placed in a driveline to allow a complete disconnect of a drive axle or some other type of powered equipment.

A modular compact design allows the unit to be reconfigured in the event of changing the unit input or output, or allows the unit to be easily serviced in any way. To assist in the rearrangement and also assist in servicing of this unit, an embodiment of the design may have o-ring type seals throughout. This ensures that the unit has minimal issues with leaking gaskets and/or the cleaning of the old sealing substance from the seal surface.

Yet another aspect of the complete power disconnect device according to an embodiment is the ability to have the unit remain engaged or disengaged during rotation of the rotating member under full power without the risk of the power being dissipated by a slipping hydraulic powered, air powered, and over center style clutch. These types of clutches often suffer from slippage, since slipping clutches are caused by many factors, such as the units being misadjusted, improper use, and also just general wear. The worst time for problems on the disc style clutch is during operation when the units have rotating members in the disengaged mode of the clutch that cause the plates to generate extreme heat and also extreme wear.

Another aspect of the modular design allows the unit to have a direct coupling of two bell housings and flywheels when direct coupling is needed, with the ability of being disconnectable in a minimal space between the engine. This design can be used on engine powered equipment to allow the engine to run continuously in a connected or disconnected state with out causing unnecessary wear of internal components.

An embodiment of this design allows the integration of both pressure activation and also mechanical engagement of the power transmission. This further enhances the ability to mount this type of unit in a multitude of power transmission applications without the need for other power sources, such as a hydraulic or air power source. A simple slide, mechanical lever, cable or other power mechanism can be used to engage the power transmission of this unit.

Yet another aspect of the design in the complete PTO disconnect, according to an embodiment, is one in which the engagement fork lever also has an integrated built-in stop of the unit to disallow over travel of the shifting arm by this or any other way.

Yet another aspect of the design, according to an embodiment, ensures that the unit will remain in an engaged setting during operation by using an offset tooth profile design that will not allow the unit to "Kick-out" of gear while running. This offset design also allows for a positive engagement and disengagement to reduce the risk of any accidental powering to un-powering of the driven equipment.

Advantageously, the device can also be designed to be mounted directly to a power transfer case in mobile equipment such as a split shaft power transmission or any other power transmission mechanism.

DESCRIPTION OF THE DRAWINGS

For a complete understanding of the objects, techniques and structure of the invention reference should be made to the following detailed description and accompanying drawing wherein.

DETAILED DESCRIPTION OF THE PREFERRED EMBODIMENTS

Figure 1B:
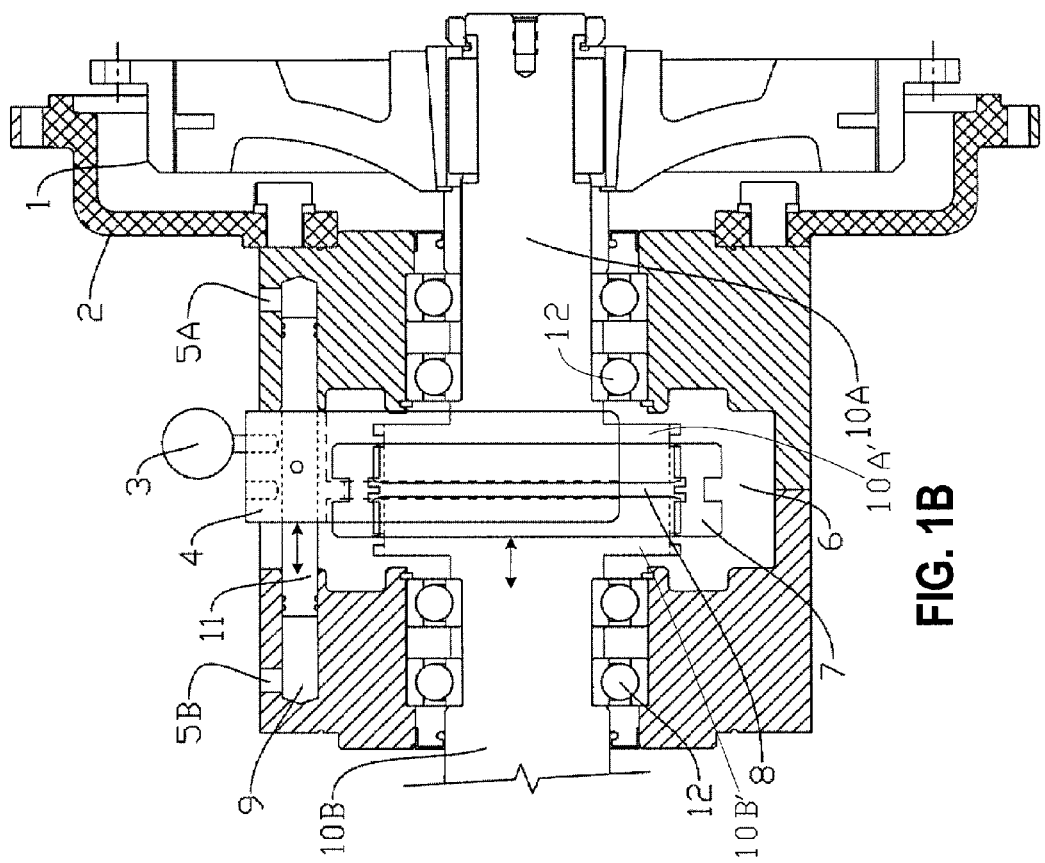
FIG. 1B is a cross-sectional cutaway view in a plane parallel to the axis of rotation of a complete power take-off device.
Figure 1A:
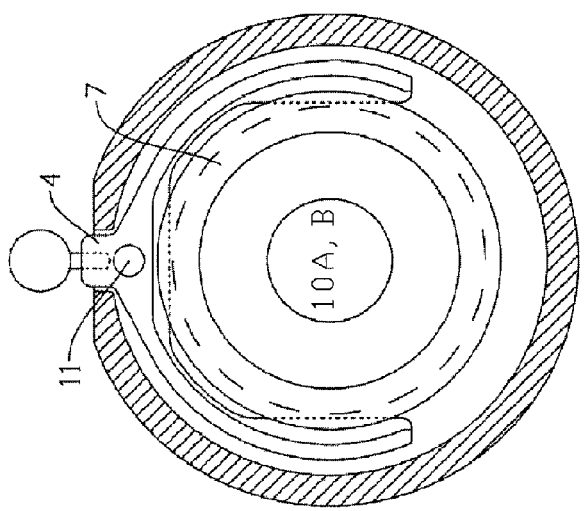
FIG. 1A is a cross-sectional cutaway view in a plane perpendicular to the axis of rotation of a complete power take-off device.
Figure 1C:
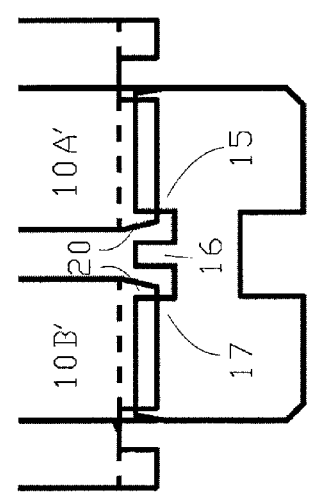
FIG. 1C is a magnified view of the interface between the clutch and the respective ends of the shafts.

Referring to FIGS. 1A-C, the complete power take-off clutch unit can be seen with an example of a bell housing 2 and torsional coupling 1 installed to a base disconnect assembly housing that has a shaft protruding member 10A supported by bearings or a shaft support portion 12 that continues to the clutch interface chamber 6 (possibly an oil sump area) where it terminates with a spline outside diameter (OD) on the shaft 10A. A corresponding structure is provided for the output/driven shaft 10B.

Supported on ends 10A', 10B' of the shafts 10A, 10B with the interface chamber 6, is a clutch 7 that is allowed to span a gap in the drive line 8 between the shaft ends 10A', 10B' to couple the input 10A and output 10B members that extend to the opposing sides. This clutch 7 can be in a rest (or disengaged) position on either the input or output shaft side.

For the two rotating members 10A, 10B to be joined in an "engaged mode" state, the shift fork 4 must reposition the clutch 7 over the ends 10A', 10B' of the two rotating shafts 10A, 10B. This can be accomplished with pressure in the 5A or 5B portions of the pressure port that then in turn fills the chamber 9 to transfer the shift fork 4 via the shift rod/piston 11 to the opposite position against a positive stop in the housing. If this process is reversed in the action of switching the pressure from the 5A or 5B (depending on the position) the unit will then be able to move the shifting fork 4 to the other position "neutral mode" state that will then no longer allow the output driven shaft 10B to turn. This action can also be accomplished by using the mechanical shift handle 3. The mechanical shift handle 3 can also serve as a back up to assist the unit in the event of a pressure system failure.

This complete power take off assemble is also designed for the ability to have a bell housing 2 such as that illustrated in FIG. 1 installed on either end. Splined teeth 20 on the OD of both end parts 10A', 10B' of the shafts 10A, 10B, match teeth 15, 17 (FIGS. 1C and 2) on the ID of the engagement clutch 7. This clutch 7 and appertaining portions of the shafts 10A, 10B are made of a hardened metal and designed not to wear.

Figure 2:
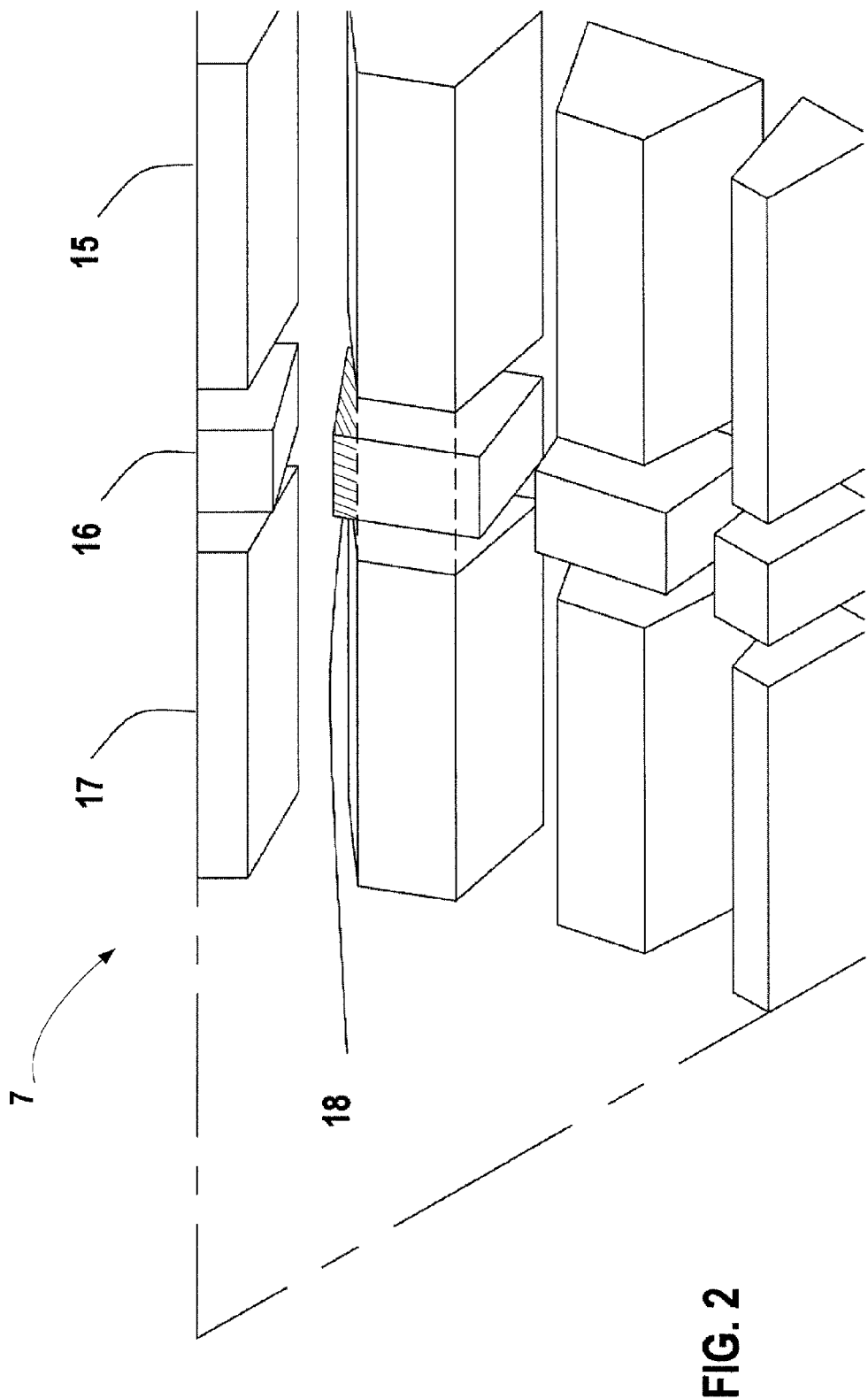
FIG. 2 is an isometric view illustrating detail within the engagement clutch itself.

As can be seen in FIGS. 1C and 2, teeth 15, 17 join the two shafts 10A, 10B, respectively, to allow the rotation to be transmitted from one shaft to the other. The slightly larger (in angular measure of a top surface) lock tooth 16 rests between the two shafts and causes the clutch to remain in the shifted position—the teeth 16 protrude into the center of the clutch 7 ring to allow the interface when the clutch is shifted similar to that used in an automobile transmission. In a practical sense, this amounts to a difference in size of a few thousandths of an inch (0.001"-0.010", depending on the material used, operating conditions, etc. The leading edge of the teeth may be angled or rounded in order to facilitate movement from an engaged to disengaged position and vise versa. The tooth lock area 18 holds the clutch 7 in the shifted position by not allowing the unit to slide to the disengaged position with out applying a large amount of force, or at least significantly more force than is required simply to move the clutch.

The invention is not limited to a purely linear motion of the engagement clutch 7 bringing it out of contact with one of the shafts 10A, 10B, but could also potentially utilize a radial movement of the shifting member/fork 4, however, such a configuration would be more complex and require more parts. It should be noted that the unit associated with the clutch should be stopped prior to engagement.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

| | |
|---|---|
| 1 | torsional coupling |
| 2 | bell housing |
| 3 | mechanical shift handle |
| 4 | shift fork |
| 5A, 5B | pressure port portions; pressure shift inlet/outlet |
| 6 | interface chamber; oil sump area |
| 7 | engagement clutch |
| 8 | gap in drive line |
| 9 | chamber |
| 10A, 10A' | input/driving shaft; drive line, end portion of shaft |
| 10B, 10B' | output/driven shaft; drive line, end portion of shaft |
| 11 | shift rod/piston |
| 12 | shaft support roller bearings |
| 15 | clutch input drive tooth (correspondingly, first outer annular row of teeth) |
| 16 | clutch lock tooth (correspondingly, third inner annular row of teeth) |
| 17 | clutch output drive tooth (correspondingly, second outer annular row of teeth) |
| 18 | clutch lock area |
| 20 | teeth on the outside diameter of the shaft end portions |

What is claimed is:

1. A power takeoff assembly, comprising:
   a first shaft having an interface end portion with teeth on its outer diameter, the first shaft having a longitudinal axis;
   a second shaft having an interface end portion with teeth on its outer diameter, the second shaft having a longitudinal axis that is collinear with the longitudinal axis of the first shaft;
   a gap between the first shaft and the second shaft in a direction along the longitudinal axes of the shafts;
   an annular clutch having teeth along its inner diameter that engage the teeth of the first shaft and teeth of the second shaft when the clutch is in an engaging position, and that engage only the teeth of the first shaft or the teeth of the second shaft when it is in a disengaging position, the engaging position and the disengaging position being linearly displaced from one another along the longitudinal axis of the shafts;
   wherein the teeth of the annular clutch comprise at least two annular rows of teeth, a first outer row and a second outer row separated by at least one gap from the first outer row, the first outer row designed to engage the teeth of the first shaft, and the second outer row designed to engage the teeth of the second shaft, when the clutch is in the engaging position;
   wherein the annular clutch comprises a third annular inner row of teeth residing between the first outer row and the second outer row, the third inner row separated from the first outer row and the second outer row by gaps, wherein either drive face of each tooth of the third inner row of teeth subtends an angle that is slightly greater than a drive face of each respective tooth of the first outer row and the second outer row, thereby retaining the clutch in its engaged or disengaged position absent a force significantly greater than that required to simply move the clutch from its engaged to its disengaged position.

* * * * *